United States Patent [19]

Siml et al.

[11] Patent Number: 4,737,243

[45] Date of Patent: Apr. 12, 1988

[54] METHOD FOR DECOLORATION OF TRIETHYLENETETRAMINE (TETA)

[75] Inventors: Robert J. Siml, Lake Jackson; Clara S. Dannhaus, Angleton; Enrique G. Ramirez, Lake Jackson, all of Tex.

[73] Assignee: The Dow Chemical Company, Midland, Mich.

[21] Appl. No.: 809,109

[22] Filed: Dec. 16, 1985

[51] Int. Cl.$^4$ .......................... B01D 3/34; C07C 85/26
[52] U.S. Cl. ........................................ 203/29; 203/35; 203/91; 564/498
[58] Field of Search ................... 203/6, 29, 35, 38, 34, 203/41, 91; 564/498, 497, 499

[56] References Cited

U.S. PATENT DOCUMENTS

| | | | |
|---|---|---|---|
| 3,217,026 | 11/1965 | Vertnik et al. | 564/498 |
| 3,472,739 | 10/1969 | Ross et al. | 203/41 |
| 3,595,921 | 7/1971 | Pitts | 564/498 |
| 3,723,529 | 3/1973 | Pitts et al. | 564/498 |
| 3,819,710 | 6/1974 | Jordan | 564/497 |
| 4,379,024 | 4/1983 | Gardner | 203/6 |
| 4,570,019 | 2/1986 | Gibson et al. | 564/498 |

FOREIGN PATENT DOCUMENTS 150075  7/1985  European Pat. Off. ............ 564/498

*Primary Examiner*—Wilbur Bascomb
*Attorney, Agent, or Firm*—Donald Gunn

[57] ABSTRACT

A method of removing color from crude triethylenetetramine (TETA) is disclosed. In the preferred procedure, acid treated clay or acidic form zeolite are mixed with the TETA at elevated temperatures. After several hours exposure, the TETA is distilled to obtain a decolored product. The decoloration can be a continuous or batch process. The distillation is performed in the presence or absence of the catalyst.

11 Claims, No Drawings

METHOD FOR DECOLORATION OF TRIETHYLENETETRAMINE (TETA)

This invention relates to the decoloration of triethylenetetramine (TETA) by the catalytic action of acidic solids such as acid clays or zeolites. More specifically, TETA undergoes color reduction when contacted by the solid catalysts and distilled under vacuum to yield a more desirable product.

The background of this invention deals with the tendency for TETA to occur in crude (discolored) form. Such coloration may stem from residual metal catalysts from a previous processing step, or from unidentified organic contaminants obtained during manufacture. Whatever the cause, it is obvious that a less colored amine product would be more desirable; indeed various other amines which are produced industrially show a susceptibility to discoloration, and the treatment described herein need not be grudgingly limited to TETA alone. Because it is axiomatic that a purer product is a better product, this invention has applications especially to TETA decoloration.

With respect to acidic solids in general and zeolites in particular, past and present studies on such materials as chemical catalysts can only be described as voluminous. The petroleum industry uses these catalysts for so called catalytic cracking operations in the production of gasoline and other fuels. Besides commercial interest, zeolites have been the subject of intense academic investigation: Detailed studies of the mechanisms involved in catalytic cracking operations abound and support the current understanding of the role of acid sites on the solid catalysts. In principle, those acid sites on solids perform functions similar to those of homogeneous acid catalysts such as mineral acids. Thus, solution chemistry has an analogy in heterogeneous catalytic chemistry, as solid acid sites exhibit both Bronsted and Lewis type acidity.

Much of the appeal of conventional catalytic operations has its genesis in the solid-fluid nature of the processes, as well as the prospect of regenerating and recycling the solid catalyst particles. Costly separations are minimized in that solid catalyst pellets which are insoluble in the reaction medium pose no difficulties which would required extraction, precipitation, distillation, etc., to remove the catalyst. On the contrary, fixed bed operations are common, whereby the reaction mixture flows over and through a confined mass of solid catalyst. The economics of scale demand continuous processing methods wherever possible, so these classes of techniques make attractive means. Laboratory methods, however, where many discoveries occur, often employ batch rather than continuous processing, with separation techniques which do not lend themselves well to large-scale practice.

That solid-liquid methods are more convenient than liquid-liquid ones cannot be denied. For example, consider U.S. Pat. No. 3,217,026 which describes a treatment method for decoloration of polymeric secondary amines. The method of the patent requires the use of an acidic clay simultaneously with a mild ammonia solution. The process appears to rely on the absorbent characteristics of the clay to remove metal ions which cause the coloration of the amines. Aside from the fact that there are other sources of color, this process must involve a liquid-liquid extraction step, partitioning an aqueous phase from an organic phase. Aside also from the desire to avoid ammonia if possible, one would certainly prefer a method which eliminated the two phase fluid extraction step. Finally, it should be kept in mind that U.S. Pat. No. 3,217,026 is a low temperature process; a catalytic process might show a temperature dependence which would present a different operating range. Zeolites are crystalline, porous aluminosilicates which exhibit catalytic properties. Their chief applications have depended on the acidic sites of the matrix for formation of carbonium ions in the reactant feedstock. Catalytic cracking and reforming operations appear to rely on such a mechanism. These solids are readily available in many different forms, with various internal pore structures and geometries. Catalytic activity depends on the number and strength of the individual acid sites in a given pellet, and the physical characteristics of such materials are well known. The ideal amine treatment process might use these solid materials for decoloration if such a reaction were possible.

That ideal method would be superior to techniques of the prior art, such as in U.S. Pat. No. 3,755,447 which relates to a complexation technique requiring an inorganic salt. There, the inorganic salt complexes with the amine reactant after which a hydrocarbon solvent may be used to extract the salt complex. Then the purified amine is isolated from the resulting two-phase liquid mixture.

Extraction techniques are numerous, and to some extent, similar to each other. But the ideal would be a true catalytic operation without the need for a liquid-liquid extraction step at all. Heterogeneous catalysts would further eliminate the Hobson's choice of separating the dissolved catalyst from the product or leaving it in as a residual contaminant. And the best such heterogenous process would employ solid catalysts which are already known and are readily available. The prior art fails in this regard.

Broadly, our invention does just that, by treating crude TETA with a common acidic catalyst. Previously, the undesirable yellow color of the TETA could be removed by KOH treatment in a semi-batch process. Now, experimentation with various acidic catalysts has revealed that certain such materials act on the TETA to give a less colored product when distilled. The advantages include the ability to avoid the periodic necessity of charging KOH to a separation column whenever the TETA product falls below specifications for color. And, the KOH disposal and neutralization problems are also eliminated.

The solid catalysts found acceptable according to this invention include type Y zeolites, such as Union Carbide's LZY-52 or SK-500; Filtrol grades 13 and 62 clay are alsod effective. Whichever of the above classes of materials is chosen, acidification to the hydrogen form is necessary (e.g., sulfuric acid treatment of the Filtrol clay). One proven equivalent includes Filtrol grade 62 clay, and proposed equivalents include essentially all acid activated clays or acidic zeolites. As witnessed by the effectiveness of SK-500, rear earth exchanged forms of zeolites would seem also to be included. Nor is there any reason to limit the invention to TETA alone, as the entire class of polyalkylene polyamines should be successfully treatable by the present invention.

Whichever of the acid catalysts is chosen, and whichever of the polyalkylene polyamines, the invention vacuum distillation of the mixture is preferred and is required with those species boiling above 200° at atmospheric pressure because of the tendency to degrade at the higher temperatures. But because of the nature of zeolites and clays, the whole slurry may be charged to the distillation unit without fear of degrading the catalyst as a result of overheating.

EXAMPLE I 600 grams crude TETA (>200 APHA* color) was contacted by stirring with 4% (wt.) Filtrol grade 13 clay at 200° C. for 6 hours. The slurry was charged to a 30-tray Oldershaw distillation column where the overhead pressure was about 5 mm Hg, with about 2.3/1 reflux ratio. The purified overhead product of the distillation column recovered was measured in volume and color was also determined:

| Fraction | Volume (ml) | Color (APHA) |
| --- | --- | --- |
| 1 | 50 | 80–90 |
| 2 | 150 | 50 |
| 3 | 150 | 40–50 |
| 4 | 100 | 40–50 |
| bottoms | approx. 150 | >200 |

*using a platinum cobalt scale

EXAMPLE II

The method of Example I was followed (with a sample similar to Example I having >200 APHA color on the same scale) with the catalyst now being the type Y zeolite, namely, Union Carbide LZY-52. Again, the overhead product volume and color was:

| Fraction | Volume (ml) | Color (APHA) |
| --- | --- | --- |
| 1 | 50 | 70–80 |
| 2 | 150 | 60 |
| 3 | 150 | 60 |
| bottoms | approx. 250 | >200 |

EXAMPLE III

Here the catalyst used was Filtrol grade 62 clay, in the form of calcined ⅛" pellets. The crude TETA (with a sample similar to Example I having >200 APHA color on the same scale) flowed into a cylindrical stainless steel pipe which contained the catalyst, thus constituting a continuous flooded bed operation. The TETA flow rate was 1.8 ml/min. through the 1"×28" cylinder (giving a 2.18 hour residence time, or a liquid hourly space velocity of 0.46 hr.$^{-1}$), with 235 cm.$^3$ of solid catalyst having been charged to the reactor. Reaction temperature was 225° C. After the initial catalytic treatment, the effluent was then separated from the catalyst and transferred to the distillation column to replicate Examples I and II.

| Fraction | Volume (ml) | Color (APHA) |
| --- | --- | --- |
| 1 | 50 | 80 |
| 2 | 150 | 70 |
| 3 | 150 | 70 |
| bottoms | 250 | 200 |

It should be noted that the TETA retains its discoloration after the catalytic reaction until distillation, and the vacuum distillation step appears essential. Proper distillation technique insures a minimum of TETA degradation due to thermal and oxidative effects, so that over 95% of the TETA charge survives the treatment.

The preferred conditions for the reaction step are flexible, with acceptable reaction temperatures from 100°–250° C., although 150°–225° C. is better. Likewise, pressure may go as high as 800 psia, although an upper limit of 100 psia would be preferable. Finally, residence time can be on the order of several hours, ranging in the extreme from 1–30 hours, but with 6–20 hours being better.

In summary, the present invention advances the state of the art amine decoloration processes by using common catalytic materials and enabling the process to operate continuously. In the examples given above, the vacuum distillation step was carried out as a batch operation rather than a continuous one; but in large-scale practice, that separation would naturally go on as a steady-state operation and not batch processing.

The choice reactor design and configuration is left to the discretion of the user of the invention. One of the most attractive features of the present invention is precisely the fact that its use of known catalytic materials allows flexibility in their application. A simple slurry preparation will work, as shown by Examples I and II above; or the flooded bed method of Example III may be chosen. These examples merely illustrate the variety available in applying the present invention. Of course, a fluidized bed or any other configuration would just as well work.

The process described herein appears not to demand narrow reaction conditions or precise control. The degree of color removal from the crude TETA remains another question of discretion, depending on the product specifications. The Examples above were based on a cutoff of 200 APHA as unacceptable, but that limit is a commercial one based on marketing constraints and not a chemical one based on limitations of the instant process. The loss of TETA to thermal degradation in the reaction and separation steps is minimal, being on the order of less than 5%.

While the foregoing sets forth preferred and illustrated methods, the scope of this disclosure is determined by the claims which follow.

I claim:

1. A method of reducing triethylenetetramine (TETA) coloration comprising the steps of:
   (a) reacting discolored TETA in a reaction chamber in the presence of a catalyst of acid treated clay or acidic form zeolite for a specified interval at an elevated temperature;
   (b) next distilling the TETA in a distillation apparatus at pressures and temperatures to obtain a distilled flow therefrom; and
   (c) drawing a distilled flow from the distillation apparatus of TETA with reduced coloration.

2. The method of claim 1 wherein the reaction step is conducted in a continuous flooded flow in a bed reactor having a specified TETA residence time therein to form a slurry of TETA and the catalyst introduced into the distillation apparatus.

3. The method of claim 2 wherein the step of reacting is carried out at a temperature of 150° to 225° C.

4. The method of claim 1 wherein the step of reacting is carried out at a temperature in the range of 100° to 250° C.

5. The method of claim 4 wherein the step of reacting is conducted at less than about 800 psi for less than about 30 hours.

6. The method of claim 1 wherein the step of reacting is conducted between about 6 to 20 hours.

7. The method of claim 2 wherein the reacted TETA is separated from the catalyst and then distilled.

8. A method of reducing polyalkylene polyamide (PAPA) coloration comprising the steps of:
   (a) reacting discolored PAPA in a reaction chamber in the presence of a catalyst of acid treated clay or acid form zeolite of the hydrogen form for a specified interval at an elevated temperature to form a slurry of PAPA and the catalyst;
   (b) next distilling the PAPA and catalyst slurry in a distillation apparatus at pressures and temperatures to obtain a distilled flow therefrom; and
   (c) drawing a distilled flow from the distillation apparatus of PAPA with reduced coloration.

9. The method of claim 8 wherein the reaction step is conducted in a continuous flow in a flooded bed reactor having a specified PAPA residence time therein and then distilling in a multitray column at a reduced pressure at the top of the column.

10. The method of claim 9 wherein the step of reacting is carried out at a temperature of 150° to 225° C.

11. A method of reducing triethylenetetramine (TETA) coloration comprising the steps of:
   (a) reacting discolored TETA in a continuous flooded bed reactor having a specified TETA residence time therein in a chamber in the presence of a catalyst of acid treated clay or acidic form zeolite of the hydrogen form for up to about 3 hours at a pressure less than 800 psi and a temperature of about 100° to about 250° C. to form a slurry of TETA and the catalyst;
   (b) next distilling the TETA in a multitray column at a reduced pressure at the top of the column at pressures and temperatures to obtain a distilled flow therefrom; and
   (c) drawing from the multitray column a distilled flow of TETA with reduced coloration.

* * * * *